(12) United States Patent
Moon et al.

(10) Patent No.: US 8,379,937 B1
(45) Date of Patent: Feb. 19, 2013

(54) METHOD AND SYSTEM FOR ROBUST HUMAN ETHNICITY RECOGNITION USING IMAGE FEATURE-BASED PROBABILISTIC GRAPHICAL MODELS

(75) Inventors: Hankyu Moon, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 808 days.

(21) Appl. No.: 12/286,233

(22) Filed: Sep. 29, 2008

(51) Int. Cl.
*G06K 9/00* (2006.01)
*G06K 9/62* (2006.01)
(52) U.S. Cl. ............ 382/118; 382/160; 382/170
(58) Field of Classification Search .......... None
See application file for complete search history.

(56) References Cited

U.S. PATENT DOCUMENTS

| | | | |
|---|---|---|---|
| 5,438,630 | A | 8/1995 | Chen et al. |
| 5,787,198 | A | 7/1998 | Agazzi et al. |
| 6,118,890 | A | 9/2000 | Senior |
| 6,990,217 | B1 | 1/2006 | Moghaddam et al. |
| 7,171,043 | B2 | 1/2007 | Nefian |
| 2004/0066966 | A1 | 4/2004 | Schneiderman |
| 2005/0036676 | A1 | 2/2005 | Heisele |
| 2006/0088207 | A1 | 4/2006 | Schneiderman |
| 2006/0095521 | A1* | 5/2006 | Patinkin .......... 709/206 |
| 2010/0189358 | A1* | 7/2010 | Kaneda et al. .......... 382/195 |

OTHER PUBLICATIONS

Hosoi et al, "Ethnicity Estimation with Facial Images", 2004, Proceedings of the Sixth IEEE International Conference on Automatic Face and Gesture Recognition (FGR'04), p. 1-6.*
U.S. Appl. No. 10/972,316, Agrawal, et al.
U.S. Appl. No. 11/811,614, Moon, et al.
U.S. Appl. No. 12/079,276, Moon, et al.
Ueki, K., et al, "A Method of Gender Classification by Integrating Facial, Hairstyle, and Clothing Images," in the Proc. of the 17th Int'l. Conf. on Pattern Recognition, 2004.

* cited by examiner

*Primary Examiner* — Andrew W Johns
*Assistant Examiner* — David F Dunphy

(57) ABSTRACT

The present invention is a method and system to provide a face-based automatic ethnicity recognition system that utilizes ethnicity-sensitive image features and probabilistic graphical models to represent ethnic classes. The ethnicity-sensitive image features are derived from groups of image features so that each grouping of the image features contributes to more accurate recognition of the ethnic class. The ethnicity-sensitive image features can be derived from image filters that are matched to different colors, sizes, and shapes of facial features—such as eyes, mouth, or complexion. The ethnicity-sensitive image features serve as observable quantities in the ethnic class-dependent probabilistic graphical models, where each probabilistic graphical model represents one ethnic class. A given input facial image is corrected for pose and lighting, and ethnicity-sensitive image features are extracted. The extracted image features are fed to the ethnicity-dependent probabilistic graphical models to determine the ethnic class of the input facial image.

8 Claims, 15 Drawing Sheets

METHOD AND SYSTEM FOR ROBUST HUMAN ETHNICITY RECOGNITION USING IMAGE FEATURE-BASED PROBABILISTIC GRAPHICAL MODELS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system to provide a face-based automatic ethnicity recognition system that utilizes probabilistic graphical models on ethnicity-dependent image features.

2. Background of the Invention

Automatic recognition of demographics using images has a wide range of applications, such as security, marketing, and computer user interface. Real-time applications, such as computer user interface or demographics-targeted advertisements, especially demand highly accurate demographics recognition capabilities.

Ethnicity recognition can enable such applications, for products or services to better serve the needs of individuals based on their ethnic background. Gender recognition is also representative of demographics recognition application, and shares some common characteristics with ethnicity recognition. Both the gender and ethnicity of a person can be derived from certain features of the facial image. Image analysis technologies that work for gender recognition, such as statistical pattern recognition methods, can be utilized for ethnicity recognition as well. However, the task of ethnicity recognition involves unique challenges that the task of gender recognition does not possess.

First, the notion of ethnicity comes from biological, cultural, or historical context, and is not as well-defined as the notion of gender. There are certain genetic elements that define ethnicity, but the notion of an ethnic group is only loosely defined, and often there is no clear boundary between ethnic groups. Inexperienced human observers often make mistakes determining ethnicity solely by appearance. Any automatic means for determining ethnicity will also suffer from such ambiguities. However, it is still feasible to design an ethnicity recognition method that achieves accuracy good enough for practical applications that concern several ethnic groups.

It is well-known that a human does a better job of recognizing faces within one's own ethnic group. Therefore, it is reasonable to assume that determining the ethnicity of people is an acquired perceptual ability, while determining gender may depend more on instincts. It is commonly observed that people use some set of criteria for determining ethnicity (such as skin color, facial features, etc.). The present invention bases its fundamental approach on an assumption that human perception of ethnicity involves certain high-level reasoning processes. Another assumption is that people use different reasoning processes for different ethnic groups, as some ethnic groups can be largely determined by skin color while the same criterion doesn't apply to other ethnic groups. These assumptions are also based on the observation that the variety of facial appearance due to ethnic differences has certain structure, and there are certain rules that constrain the differences between or among the appearances of facial features.

The present invention aims to solve the problem of ethnicity recognition by images, using the process of probabilistic reasoning based on image features. The reasoning process can be effectively represented using a probabilistic graphical model, where each mode of visual assessment regarding an image feature constitutes a node of the graph, and the process of reasoning are represented by the edges of the graph. Mathematically, the nodes in the probabilistic graphical model represent random variables. In the present case, they quantize certain image features that are relevant to determining ethnicity. The edge between two nodes in the model characterizes the statistical dependence between the image features that the nodes represent. The structure of the graph—what each node represents and the statistical dependence between the nodes—needs to be determined so that the graph can capture the way that certain combinations of image features can probabilistically define an ethnic class. One probabilistic graphical model can be constructed to represent each ethnic group.

In one exemplary embodiment, each graph node captures certain common image features pertaining to certain positions. In this model, the image features are simply local pixel values, or responses of certain filters to specific locations. Each node is assumed to be dependent only on neighboring nodes, so that a simpler probabilistic graphical model, such as a Hidden Markov Model, can be employed.

In another exemplary embodiment, each node represents an unknown biological characteristic that defines ethnicity. The probabilistic graphical model captures the causal process by which the observed appearance features are derived from these unknown biological factors, such as genes.

In another exemplary embodiment, each node represents a correlation between a pair of facial features—such as the relationship between the shape of the eyes and the shape of the nose.

There have been prior attempts for recognizing the demographic category of a person by processing facial images.

The approach by U.S. Pat. No. 6,990,217 of Moghaddam, et al. (hereinafter Moghaddam) addresses the problem of gender recognition by training an SVM using a large number of image instances to make use of image features that distinguish male from female. Moghaddam uses the holistic image features as a single pattern for classification. While the present invention can follow the same approach for ethnicity recognition, it instead takes probabilistic graphical model approaches to explicitly utilize the statistical correlation structure among image features that is meaningful to the given classification problem. In U.S. Pat. No. 7,505,621 of Agrawal, et al. (hereinafter Agrawal), the gender recognition (or demographics recognition in general) is based on comparing individual features, consisting of the indexed and localized feature images and their relative positions. The present invention also makes use of facial features in one of its exemplary embodiments. However, instead of employing a general machine learning approach as in Agrawal, the embodiment of the present invention utilizes the tight correlation structure between facial features under a probabilistic graphical model framework. In U.S. Pat. No. 7,848,548 of Moon, et al. (hereinafter Moon-1), a series of geometric estimations for face localization, three-dimensional facial pose estimations, and face tracking and appearance model building are performed to conduct pose-independent demographics classification. The present invention also makes use of both automatic face localization and automatic facial feature localization so that the whole process of face detection and localization can be performed without any human intervention. While the present invention makes use of such pose estimation for the purpose of normalizing the facial geometry and extracting features, it is not the main focus of the invention. U.S. Pat. No. 8,027,521 of Moon, et al. (hereinafter Moon-2) explicitly extracts facial features and hair features for gender recognition, and the present invention employs a similar approach for facial feature extraction in one of its exemplary embodiment. Unlike Moon-2, however, the present invention aims to represent an ethnic class using the statistical correlations between the extracted features. In "A Method of Gender Classification by Integrating Facial, Hairstyle, and Clothing Images," in the Proceedings of the 17th International Conference on Pattern Recognition, 2004, by Ueki, et al. (hereinafter Ueki), the gender-specific dress code and hairstyle are exploited for gender recognition, in addition to facial image features. The use of hair features is shared by the present invention. However, in Ueki, the hairstyle extraction is simplified and based on gray-level images due to the dark complexion of the specific ethnicity group, while in the present invention the hair region segmentation can deal with any kinds of skin tone and hair color.

There have been prior attempts for recognizing objects or human faces based on images using probabilistic graphical models.

In U.S. Pat. No. 5,438,630 of Chen, et al. (hereinafter Chen), an HMM (Hidden Markov Model) is employed to encode the text image structures within a given keyword. The present invention takes a similar approach, and employs feature extraction methods that are specific to ethnicity classification. In U.S. Pat. No. 5,787,198 of Agazzi, et al. (hereinafter Agazzi), a pseudo two-dimensional HMM is used to encode the image structure of a given character or a word. U.S. Pat. No. 6,118,890 of Senior (hereinafter Senior) also adopts two-dimensional HMM to encode the image structure of fingerprint patterns. The present invention also adopts a similar architecture in one of its exemplary embodiments, to represent the image structure of a human face more effectively. U.S. Pat. No. 7,171,043 of Nefian (hereinafter Nefian) utilizes a hierarchical HMM for the problem of face recognition, and the present invention utilizes a similar approach to the problem of ethnicity recognition based on facial images. Nefian utilizes observation sequence based on image blocks, while the present invention derives features that are specific to the problem of ethnicity recognition.

There have been prior attempts for extracting image features that suit the purpose of recognizing or classifying objects in images.

In U.S. Pat. Appl. Pub. No. 2004/0066966 of Schneiderman (hereinafter Schneiderman-1) and U.S. Pat. Appl. Pub. No. 2006/0088207 of Schneiderman (hereinafter Schneiderman-2), sub-classifiers are derived for certain object classes as feature extractors or as parts of a cascaded classifier to recognize the object class. In Schneiderman-2, a Bayesian network is employed to aggregate the outputs from sub-classifiers to make a decision in a probabilistic framework. The present invention employs similar approaches for deriving ethnicity-sensitive features. However, the present invention derives the features from facial feature-matched filters in one of its exemplary embodiments, to exploit the domain information. In U.S. Pat. Appl. Pub. No. 2005/0036676 of Heisele (hereinafter Heisele), component classifiers are trained and used to detect each facial feature, and the component classifier outputs along with the spatial constraints are used to recognize faces. The present invention also utilizes filters that are matched to facial components (facial features), but the filters are generated to reflect the variations in size and shape (and sometimes color) and are grouped together to represent feature combinations of an ethnic class.

In summary, the present invention achieves automatic ethnicity recognition based on facial images. Unlike some of the approaches employing holistic image features, the present invention derives ethnicity-sensitive image features based on groups of image features so that each grouping of the image features contributes to more accurate recognition of the ethnic class. It is especially a unique feature of the invention to derive the ethnicity-sensitive image features from image filters that are matched to different colors, sizes, and shapes of facial features—such as eyes, mouth, or complexion. Some of the prior inventions also apply probabilistic graphical models—such as HMM—to face recognition problems, but the present invention applies similar method to the ethnicity recognition problem, utilizing ethnic class-dependent and ethnicity-sensitive image features.

SUMMARY

The present invention is a method and system to provide a face-based automatic ethnicity recognition system that utilizes a probabilistic graphical model on image features.

It is one of the objectives of the first step of the processing to construct a filter pool from the annotated facial image database and compute the responses of the filters from the filter pool to the facial images from the facial image database. The filter responses are collected separately for each ethnic class, based on the annotated ethnicity labels; the facial image database is assumed to be annotated with ethnicity labels of the facial images.

It is one of the objectives of the second step of the processing to randomly group the filters together to form filter groups. The groups can be generated by random sampling. In one of the exemplary embodiments, the groups can be generated by sampling from different positions, so that each group has a variety of filters that belong to different positions or facial features.

It is one of the objectives of the third step of the processing to perform conditional joint histogram analysis to the filter groups, and choose ethnicity-representative filter groups for a given ethnic class. Given every pair of filters from a given filter group, the step first constructs a joint histogram of the filters conditioned on the given ethnic class and a joint histogram of the filters conditioned on the other ethnic classes. Then the histograms are compared to determine how much the grouping of the two filters together contribute to the classification of the facial images into the given ethnic class against other classes. If the total contribution from each of the filter pairs within the group is significant enough, then the filter group is selected as one of the ethnic class-dependent filter groups.

It is one of the objectives of the fourth step of the processing to construct an ethnic class-dependent probabilistic graphical model for each ethnic class and train the probabilistic graphical model. Each probabilistic graphical model utilizes the ethnic class-dependent filter groups as its observable quantities, and is trained to produce high likelihood scores to facial images belonging to the given ethnic class, and to produce low likelihood scores to facial images belonging to other ethnic classes.

It is one of the objectives of the fifth step of the processing to detect and localize faces in given images, and adjust the lighting. A detected face in a given image has a bounding box around the face that approximately delimits its position and size. The image inside the bounding box is cropped, rescaled to a standard size (for example, 30×30), and fed to the face localization step. The face localization step utilizes multiple learning machines to estimate the facial pose in cooperation, and the facial image is corrected to a standard pose based on these estimates. The lighting variation of the facial image is corrected based on a histogram equalization and linear lighting compensation method. The linear lighting compensation method first estimate the plane that fits the pixel values of the facial image, and then subtracts the estimated plane from the pixel values.

It is one of the objectives of the sixth step of the processing to compute the response of the ethnic class-dependent filter groups to the given input facial image, compute the likelihood scores of the facial image by feeding the responses to each of the ethnic class-dependent probabilistic graphical models, and choose the ethnic class that produces the highest likelihood score as the ethnicity label of the facial image.

DRAWINGS

Figures

DETAILED DESCRIPTION OF THE INVENTION

Figure 1:
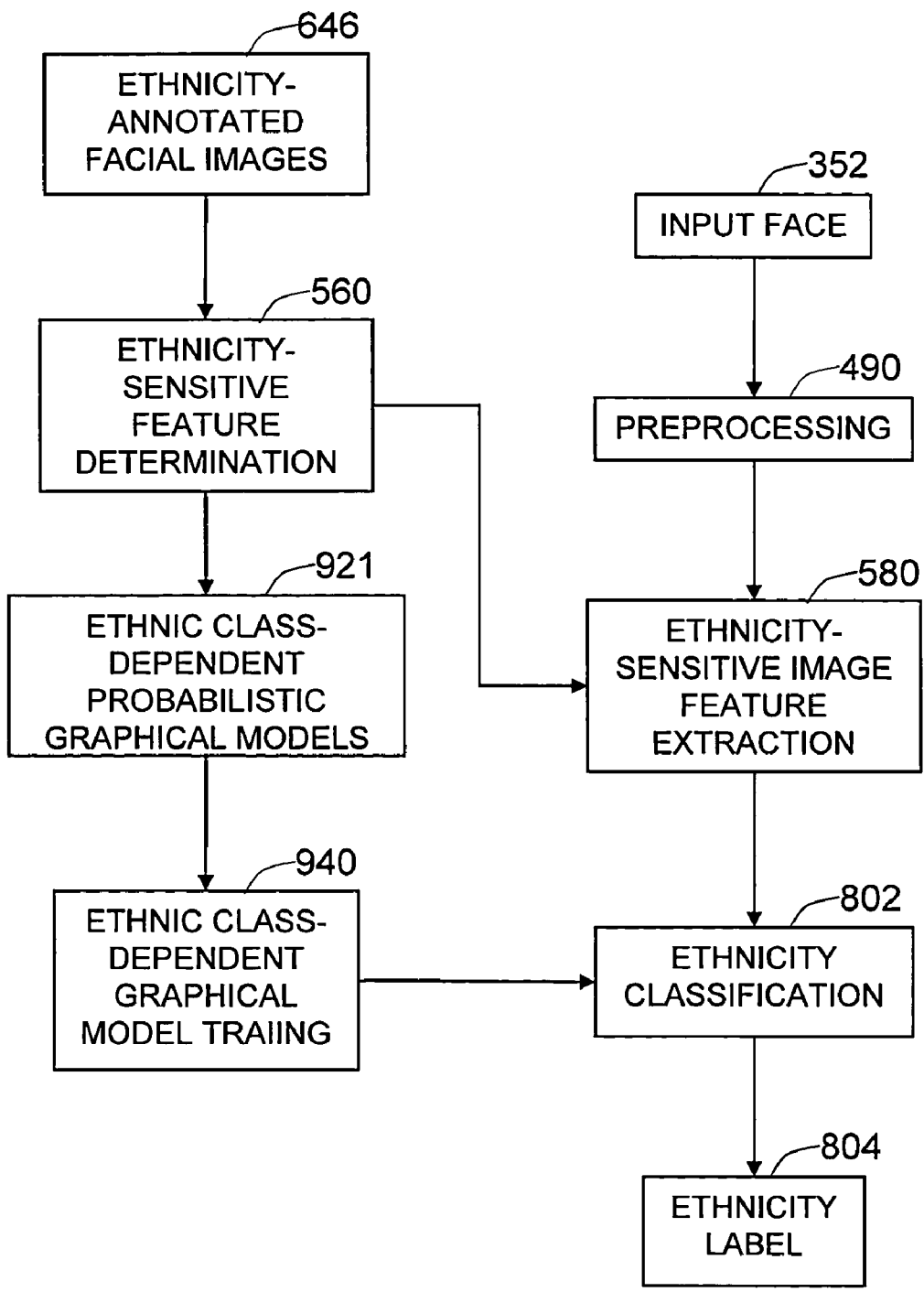
FIG. 1 is an overall scheme of the system in a preferred embodiment of the invention.

FIG. 1 is an overall scheme of the system in a preferred embodiment of the invention. From ethnicity-annotated facial images 646, an ethnicity-sensitive image feature determination 560 step derives an approach to extract image features that are relevant to ethnicity recognition. The extracted image features serve as observable variables in the ethnic class-dependent probabilistic graphical models 921, where a dedicated probabilistic graphical model is employed for each ethnic class. After each ethnic class-dependent probabilistic graphical model 920 has been built, it is trained using the ethnicity-annotated facial images 646 in the ethnic class-dependent probabilistic graphical model training 940 step. Then an input face 352 goes through a preprocessing 490 to align the facial geometry and normalize the lighting. Then the ethnicity-sensitive image feature extraction 580 step computes the image features, to be processed by the set of trained ethnicity-dependent probabilistic graphical models 921 in the ethnicity classification 802 step to determine the ethnicity label 804 of the input face 352.

Figure 2:
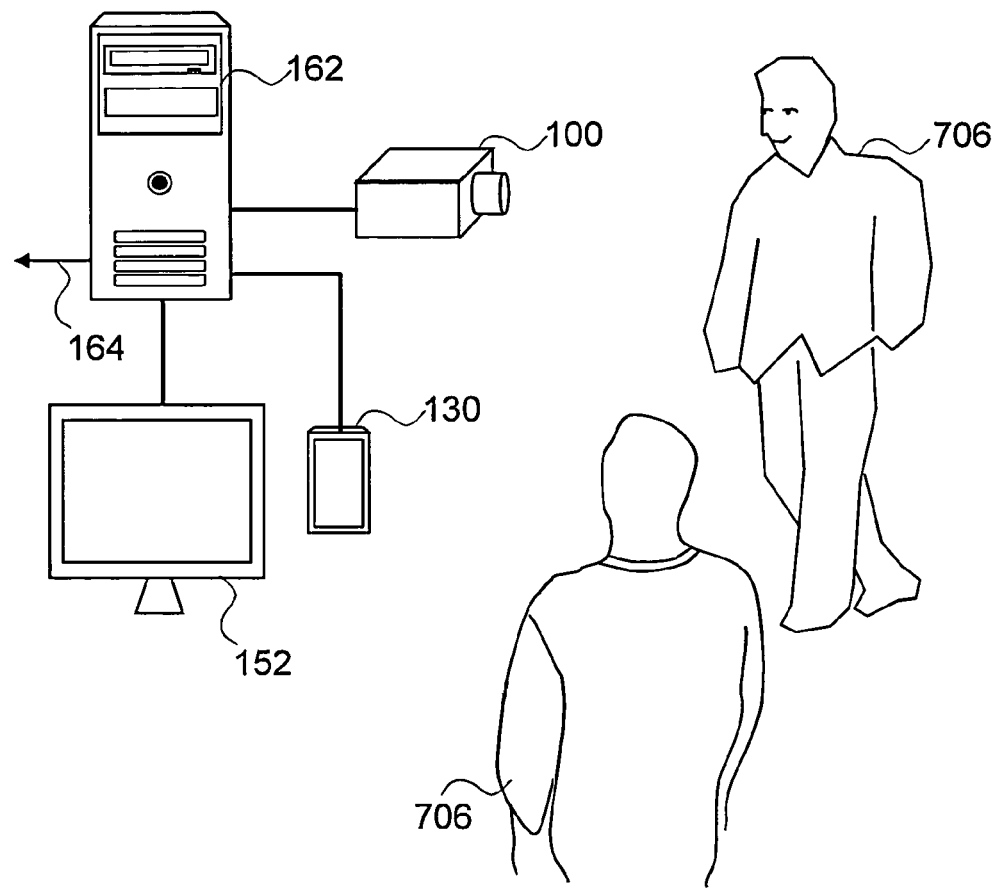
FIG. 2 shows a view of the system of the invention in an operational environment in an exemplary embodiment.

FIG. 2 shows a view of the system of the invention in an operational environment in an exemplary embodiment. The means for capturing images 100 is connected to a control and processing system 162 via analog, USB, Firewire, Ethernet, or wireless connection. The position, orientation, and the field of view of the means for capturing images 100 are determined to maximize the coverage of the target person 706. The means for capturing images 100 captures the facial images of a target person 706 and sends them to the control and processing system 162, which holds most of the processing of ethnicity recognition and generates the ethnicity labels. The recognized ethnicity data is stored to an internal or external storage 130, displayed using a visual display 152, or transmitted to a network using a network connection 164.

Figure 3:
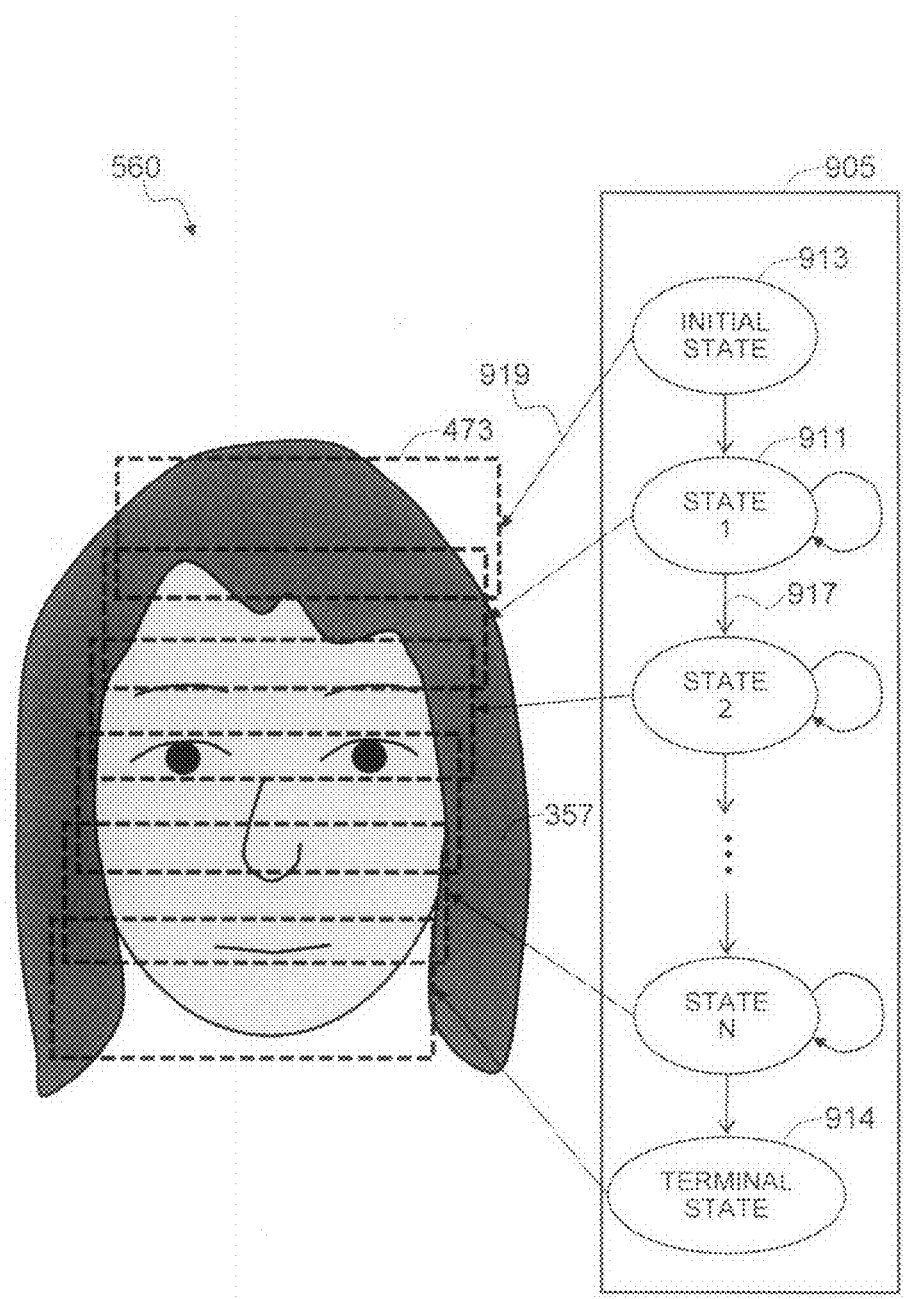
FIG. 3 shows an exemplary embodiment of the ethnicity-sensitive image feature determination step.

FIG. 3 shows an exemplary embodiment of the ethnicity-sensitive image feature determination 560 step. The facial image 357 is scanned top to bottom by a sliding window 473 to extract image features. The direction of the scanning is shown as slanted, just for a clear presentation of individual windows. The extracted features can be the raw image pixels within each window, or filter outputs of filters—such as two-dimensional cosine filters or wavelet filters—applied to the window. In this embodiment, each feature vector corresponds to a one-dimensional (vertical) position in the facial image. In this embodiment, the ethnicity-sensitive image features are assumed to be identified as statistical dependence structure within the probabilistic graphical model—an HMM 905 in this embodiment, which is comprised of an initial state 913, hidden states 911, terminal state 914, dependencies 917, and observation likelihoods 919. The observation likelihoods 919 implicitly assume the role of ethnicity-sensitive image feature determination 560.

Figure 4:
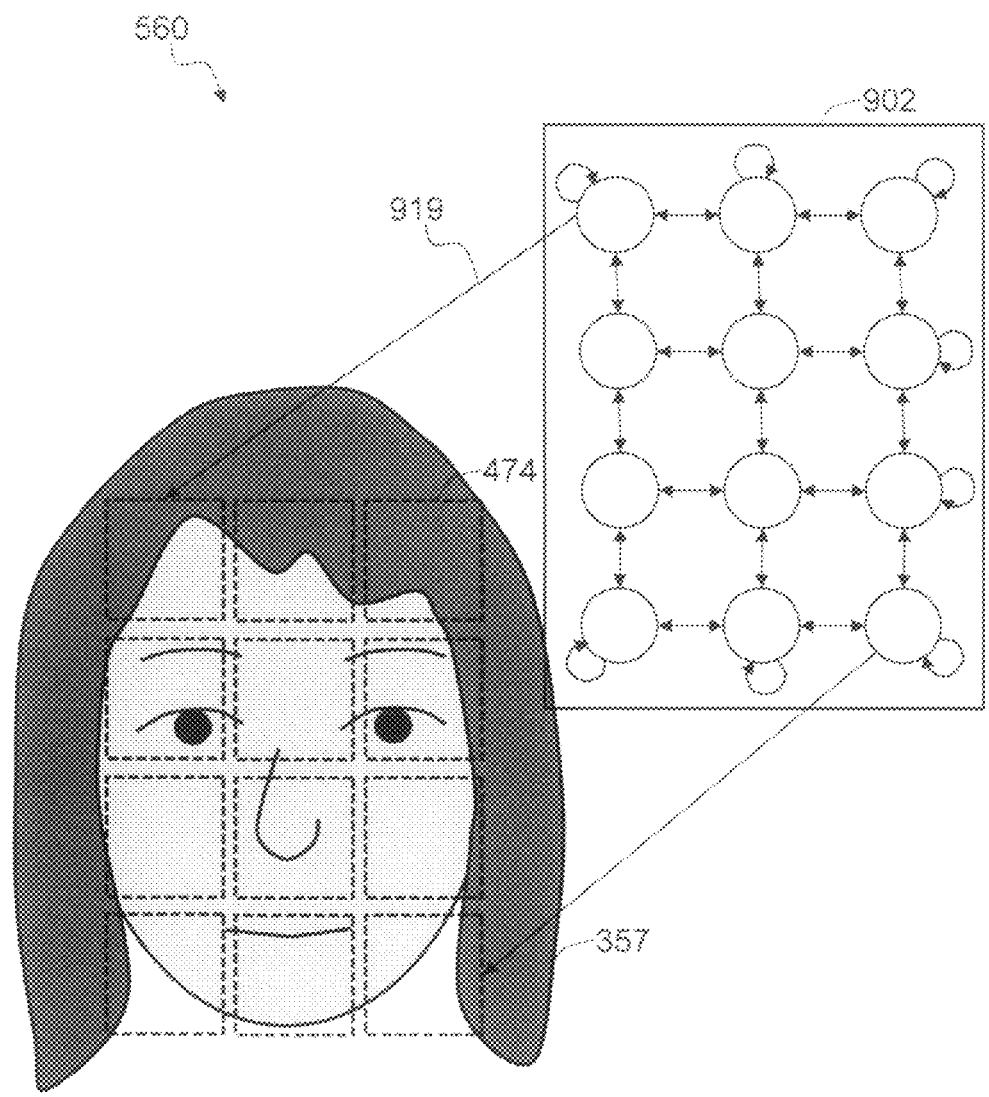
FIG. 4 shows an exemplary embodiment of the ethnicity-sensitive image feature determination step.

FIG. 4 shows an exemplary embodiment of the ethnicity-sensitive image feature determination 560 step. The facial image 357 is measured by a two-dimensional array of windows 474. The raw pixel values from each window or responses of filters—such as two-dimensional cosine filters or wavelet filters—to each window constitute the feature vector. Each feature vector is assumed to be an observable state in a two-dimensional probabilistic graphical model 902. It is assumed that a hidden state has statistical dependence only on the four neighboring states. In this embodiment, each feature vector corresponds to a specific two-dimensional position in the facial image. The ethnicity-sensitive image features are assumed to be identified as a statistical dependency structure within the probabilistic graphical model, more specifically as the observation likelihoods 919.

Figure 5:
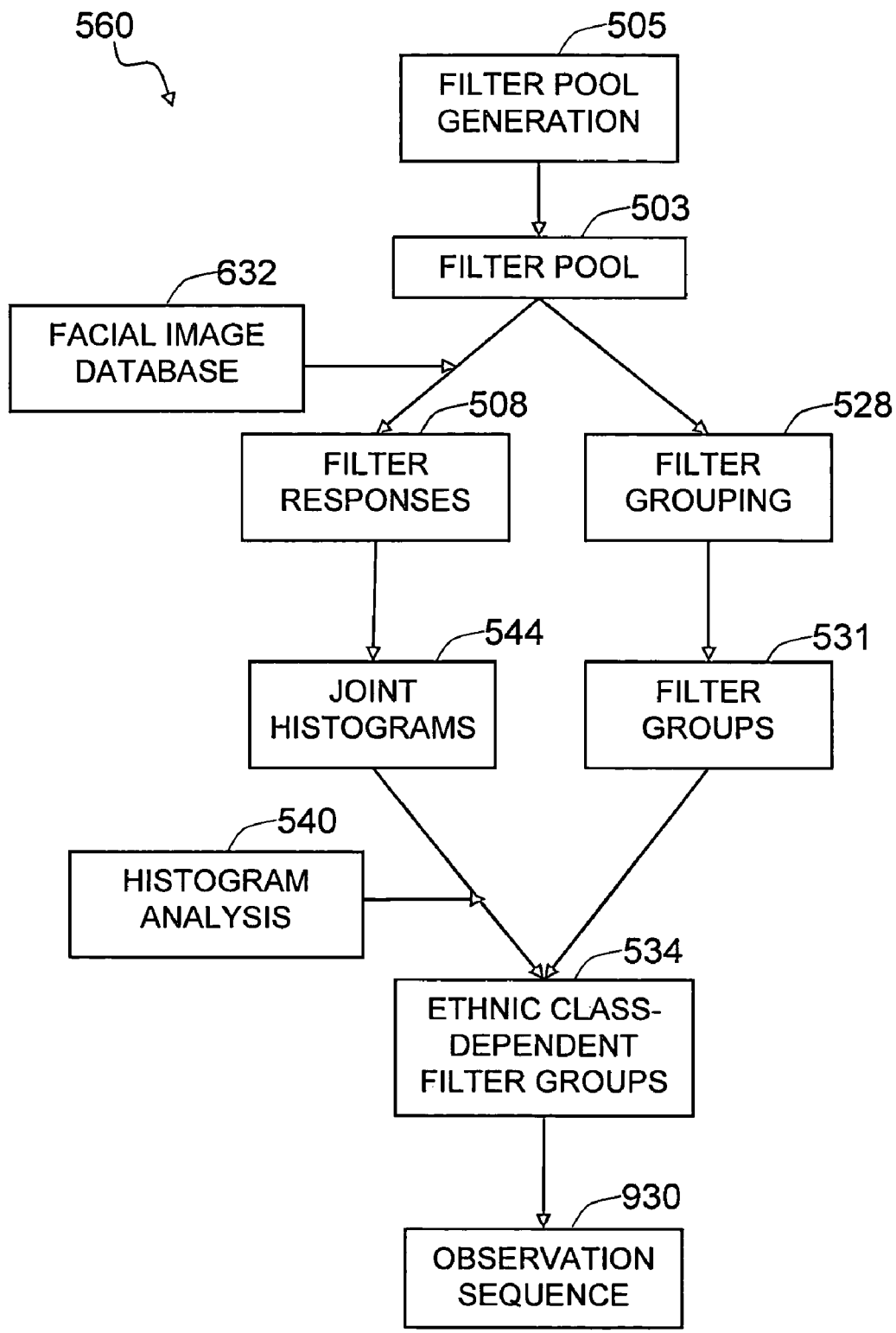
FIG. 5 shows an exemplary embodiment of the ethnicity-sensitive image feature determination step.

FIG. 5 shows an exemplary embodiment of the ethnicity-sensitive image feature determination 560 step. Unlike the previous two embodiments of ethnicity-sensitive image feature determination 560, this approach aims to explicitly derive image features that are relevant to determining ethnicity. The procedure for deriving the filters starts from generating a large number of image filters; the procedure is called a filter pool generation 505 step. The resulting filter pool 503 can have many different forms. Then the filters in the filter pool 503 are applied to facial images from a facial image database 632 to compute filter responses 508. On the other hand, the filters in the filter pool are sampled and grouped together in a filter grouping 528 step to form filter groups 531. Based on the filter responses 508, joint histograms 544 of the filter responses within each filter group are computed. From the filter groups along with their joint histograms 544, each of the groups in the filter groups 531 is analyzed in a histogram analysis 540 step to determine whether the filter group 531 satisfies certain statistical properties. Then each of the resulting ethnic class-dependent filter groups 534 is arranged in a sequence based on the order of importance for the given recognition task. In this embodiment, the filter groups 531 now serve to generate the observation sequence 930 of facial images, for an ethnic class-dependent probabilistic graphical model—such as HMM.

Figure 6:
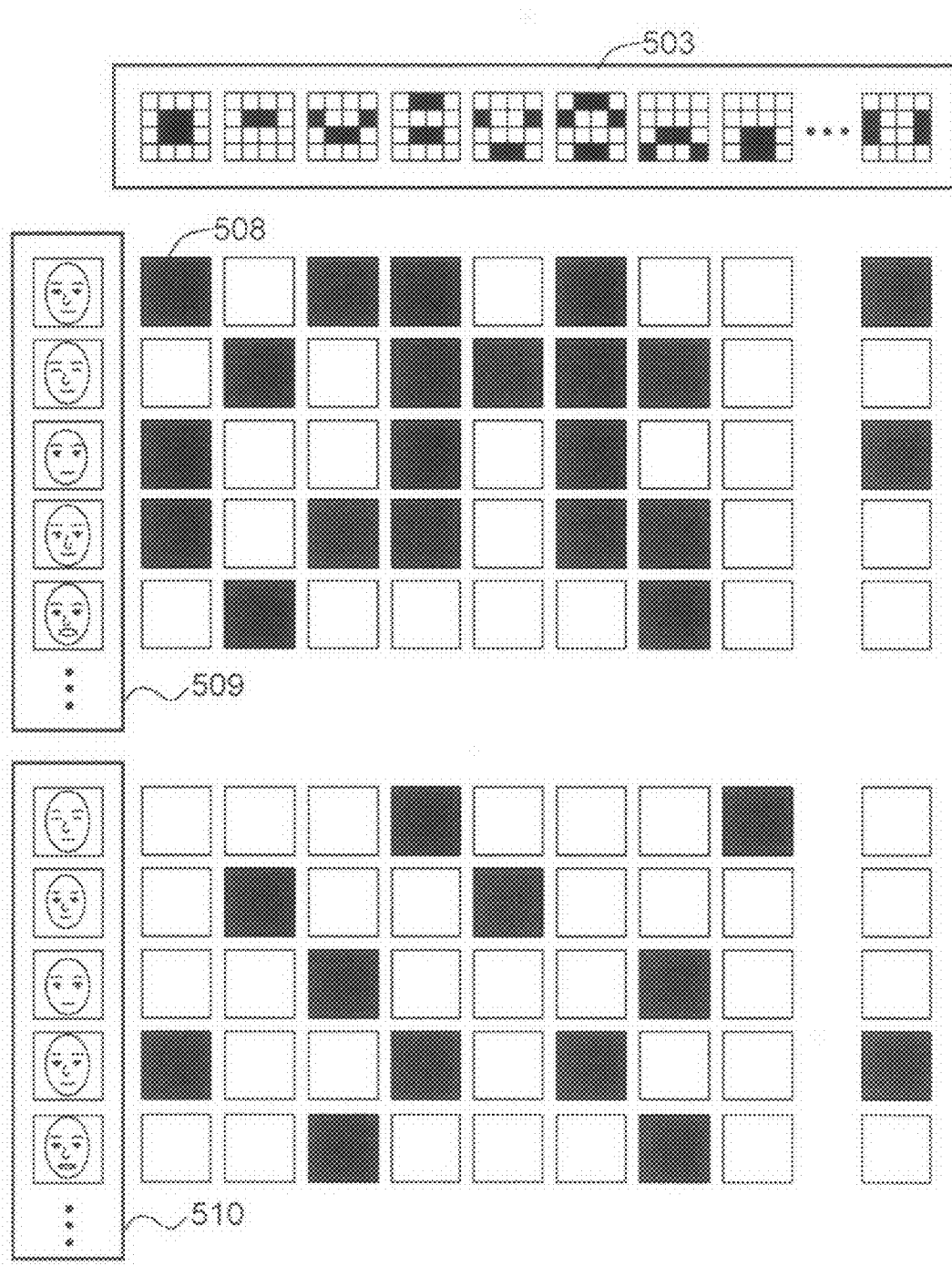
FIG. 6 shows collections of filter responses of the filters from the filter pool, computed for different ethnic classes.

FIG. 6 shows collections of filter responses 508 of the filters from the filter pool 503, computed for different ethnic classes. Any collection of filters that has diversity in sizes, shapes or locality can comprise the filter pool 503. A set of Haar wavelets or Gabor wavelets can be such a filter pool. A set of filters that are matched to the shapes and sizes of various high-level facial features—such as eyes, mouth, or nose—can also comprise the filter pool.

The filters in the filter pool 503 are applied to facial images from each ethnic class. In the figure, the filter responses to ethnic class A 509 and the filter responses to ethnic class B 510 are shown.

Figure 7:
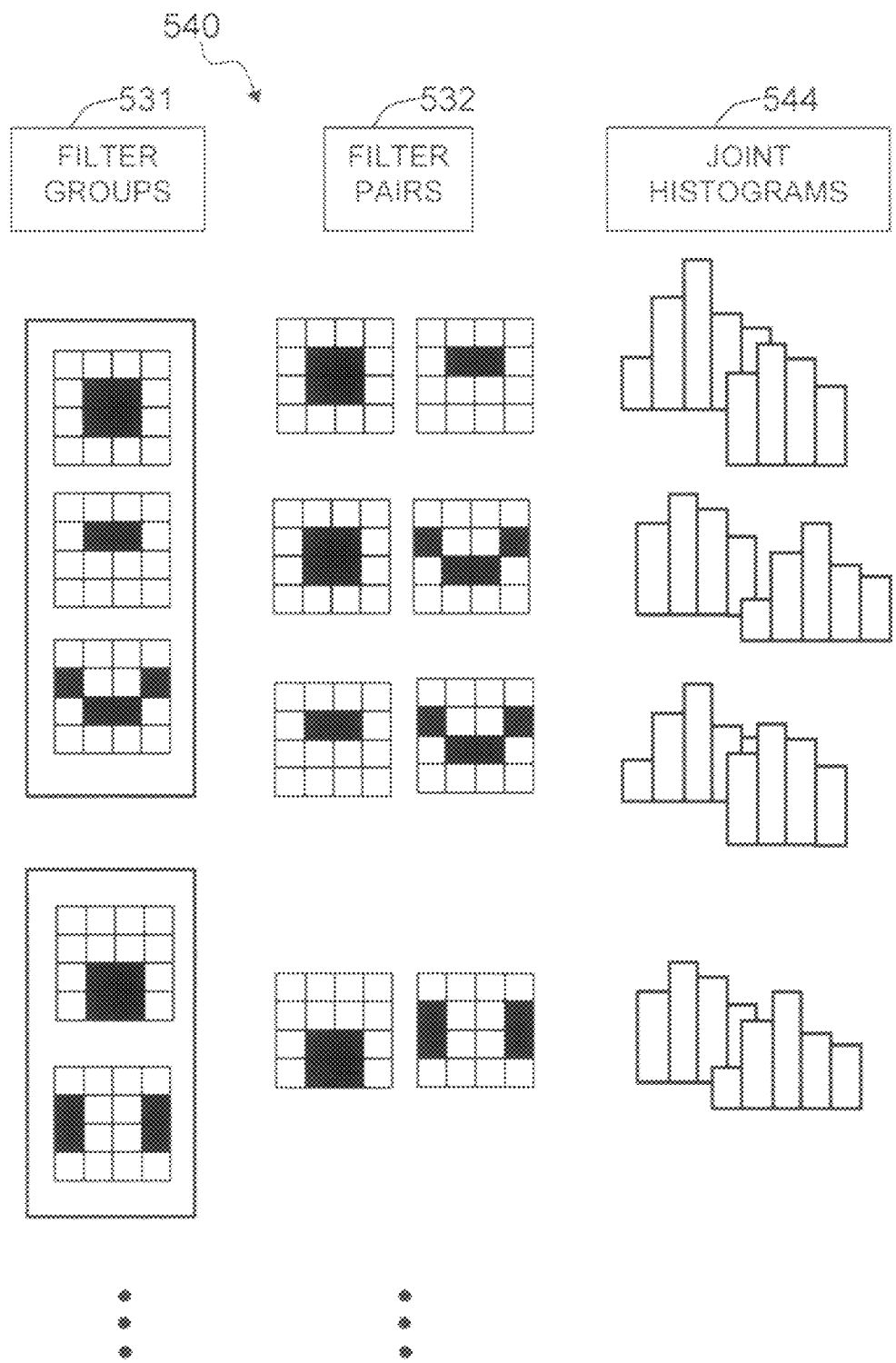
FIG. 7 shows exemplary embodiment of histogram analysis.

FIG. 7 shows exemplary embodiment of histogram analysis 540. Each filter group in the filter groups 531 is analyzed to determine whether it has enough representation power of the given ethnic class against other ethnic classes. Given every pair of filters from a given filter group, the step first constructs a joint histogram 553 of the filter pairs 532 conditioned on the given ethnic class and a joint histogram 553 of the filters conditioned on the other ethnic classes. Then the histograms are compared to determine how much the grouping of the two filters together contribute to the correct classification of the facial images into the given ethnic class against other classes. If the total contribution from each of the filter pairs 532 within the group is significant enough, then the filter group is selected as one of the ethnic class-dependent filter groups 534.

Figure 8:
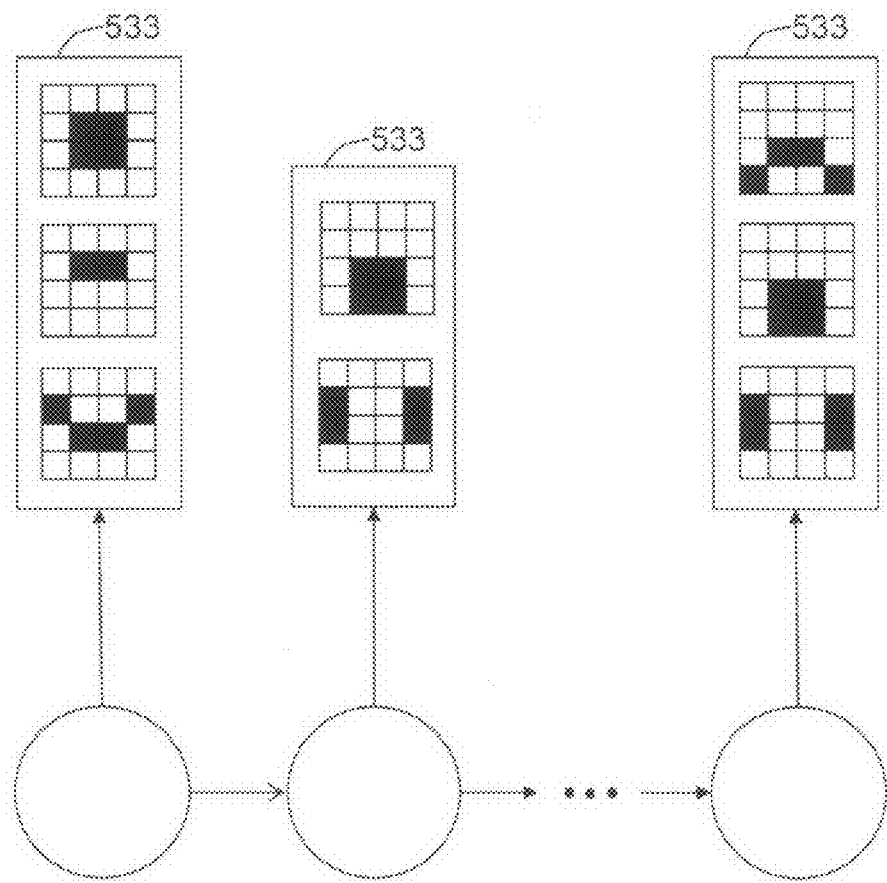
FIG. 8 shows an exemplary embodiment of the ethnic class-dependent probabilistic graphical model.

FIG. 8 shows an exemplary embodiment of the ethnic class-dependent probabilistic graphical model 920. The responses from each ethnic class-dependent filter group 533 comprise the observation sequence for the probabilistic graphical model. One such probabilistic graphical model is constructed for each ethnic class.

Figure 9:
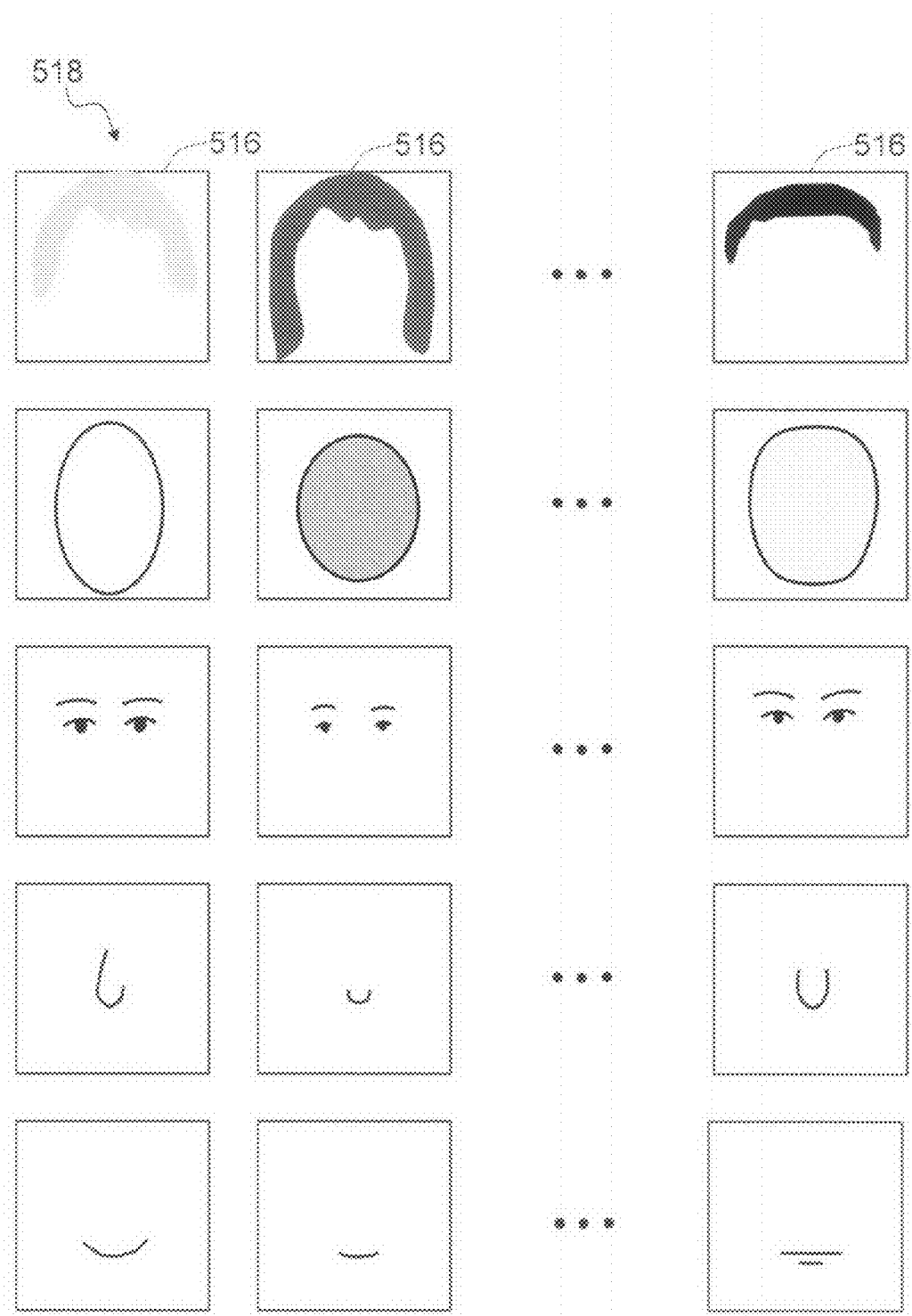
FIG. 9 shows an exemplary embodiment of the facial feature-matched filter pool.

FIG. 9 shows an exemplary embodiment of the facial feature-matched filter pool 518. The ethnicity-sensitive image feature determination 560 in this embodiment serves to derive the ethnicity-sensitive image features 550 from the facial feature-matched image filters 516. In this embodiment, the ethnicity-sensitive image features 550 measure certain attributes—such as relative positions, sizes, and shapes—of facial features. Such measurements provide straightforward meaning to the representation of ethnic classes. The filters shown in the figure aim to measure the variations of facial features in color, shape, or size. For example, in the top row are the filters to extract different styles or colors of hair. In the second row are the filters to measure different facial shapes. In the third row are the filters to measure different eye and eyebrow shapes.

Figure 10:
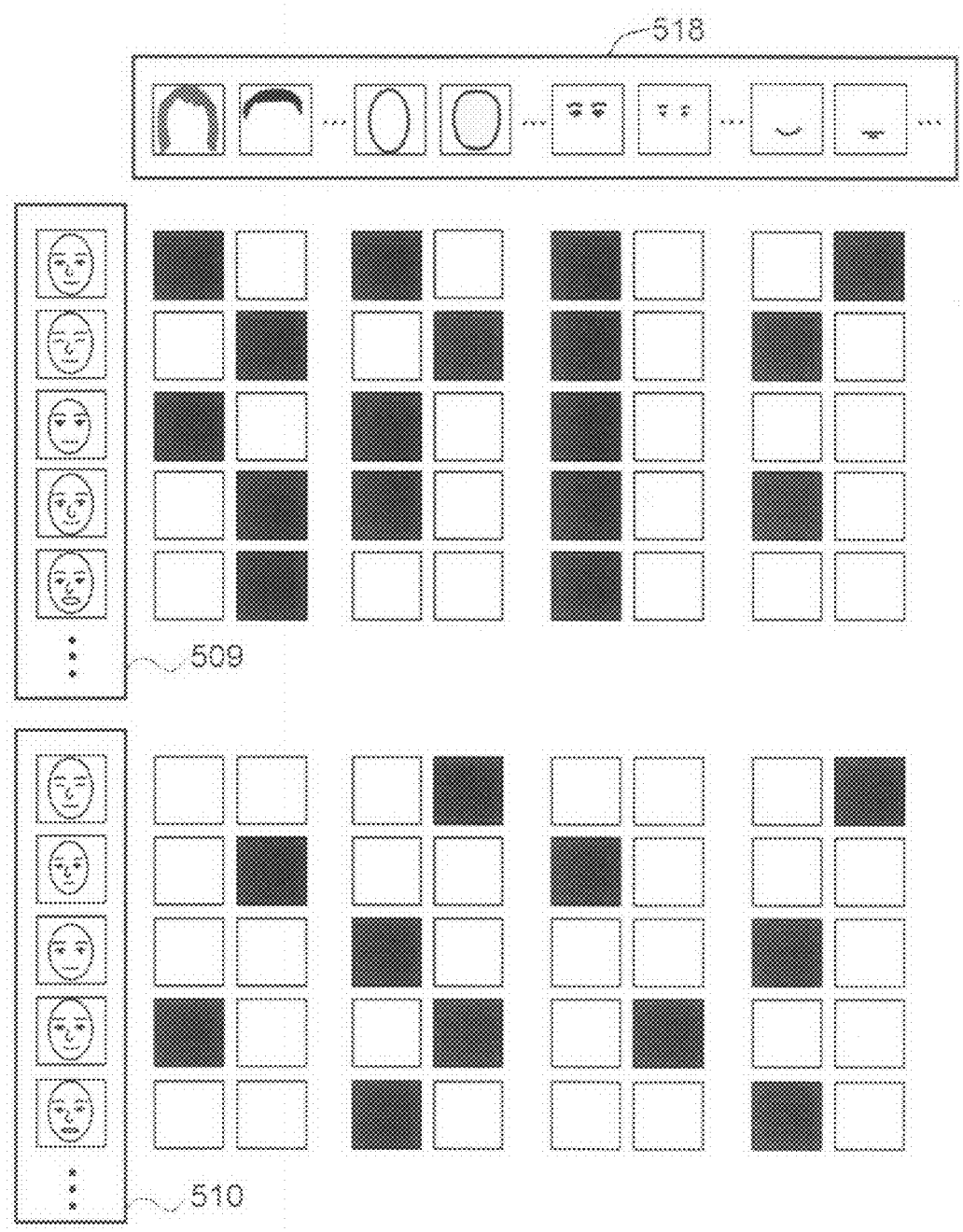
FIG. 10 shows collections of filter responses 508 of the filters from the facial feature-matched filter pool shown in FIG. 9.

FIG. 10 shows collections of filter responses 508 of the filters from the facial feature-matched filter pool 518 shown in FIG. 9. Each of the facial feature-matched filters is applied to facial images from a given ethnic class A and the facial images from anothers class B. The resulting responses—filter responses to ethnic class A 509 and filter responses to ethnic class B 510—are shown in the figure. The responses are used to construct joint histograms. The histogram analysis 540 step chooses pairs of facial feature-matched filters that are statistically relevant for representing the given ethnic class.

Figure 11:
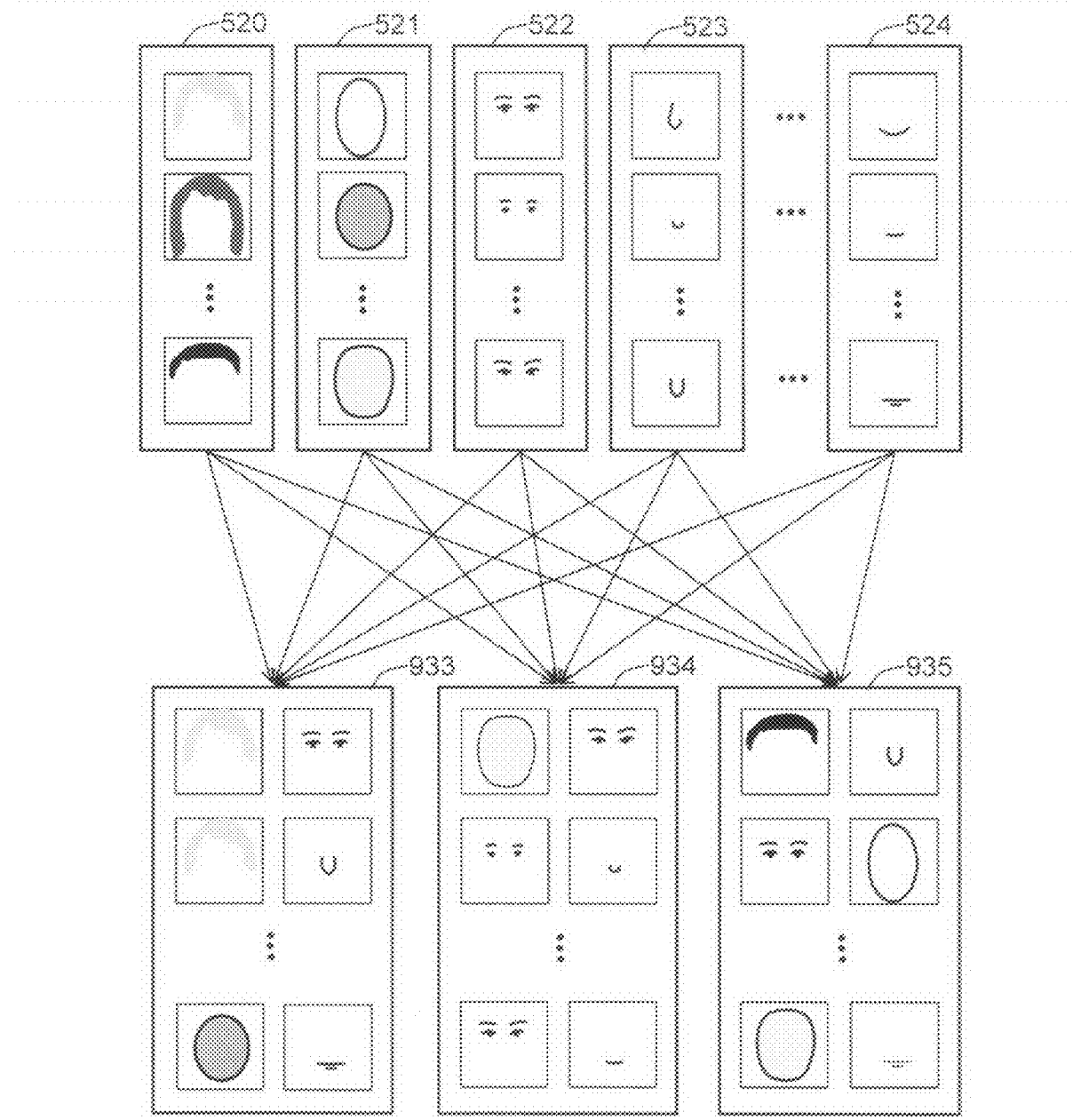
FIG. 11 shows an exemplary embodiment of the filter grouping step, when the facial feature-matched filters are used.

FIG. 11 shows an exemplary embodiment of ethnic class-dependent filter groups 534, when the facial feature-matched filters 516 are used. The top figures are facial feature-matched filters for different facial features—such as hair color/style filters 520, facial color/shape filters 521, eye shape filters 522, nose shape filters 523, and mouth shape filters 524. After the computation of responses and joint histogram analysis on the random pairs of the filters, a subset of such filter pairs is chosen to represent each ethnic class. The first column at the bottom is the chosen subset of filter pairs, which is the observation sequence for the ethnic class A 933. Likewise, the second column is the observation sequence for the ethnic class B 934. The third column is the observation sequence for the ethnic class C 935. The order within the sequence can be determined by the statistical significance of the filter pairs.

Figure 12:
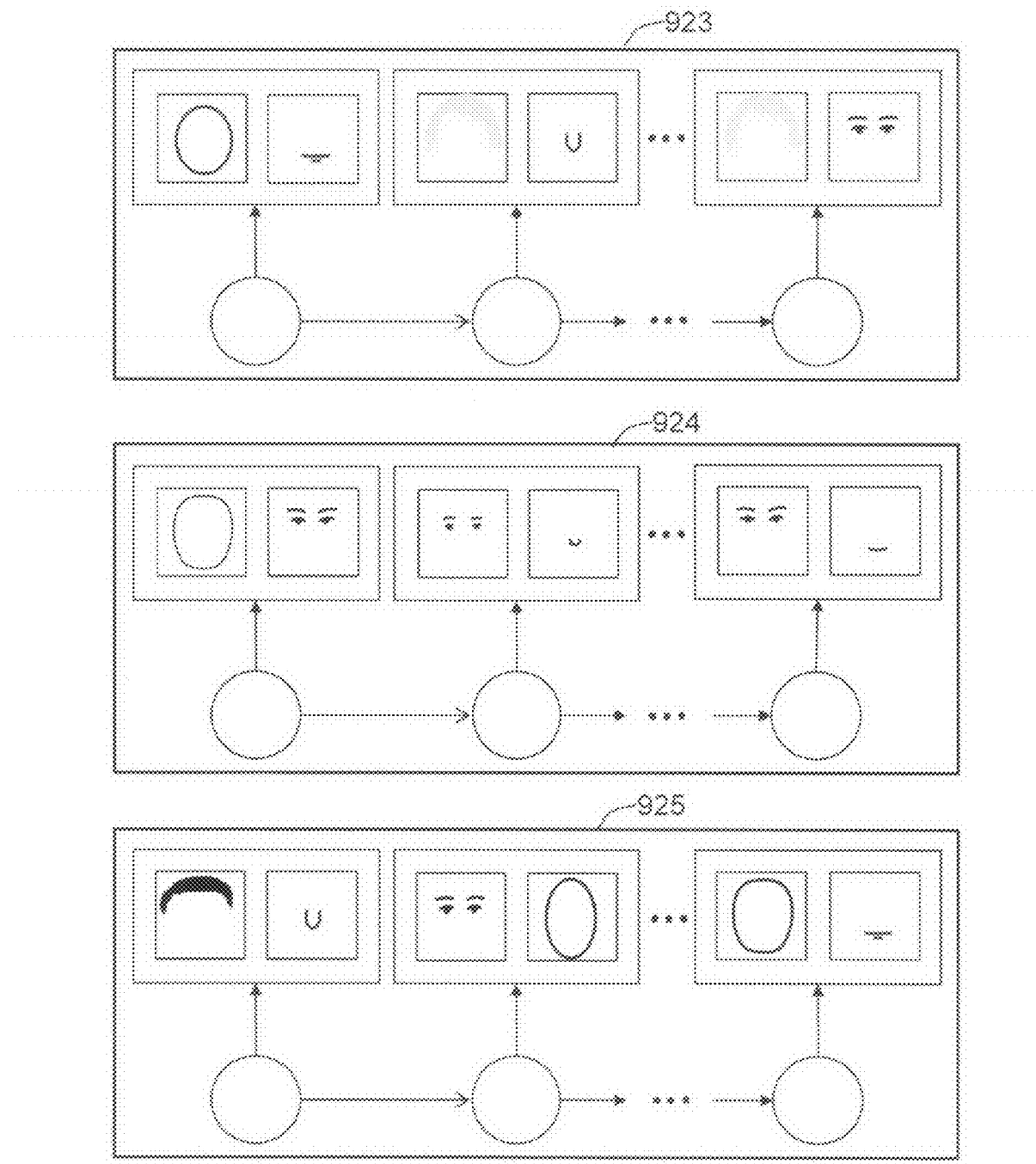
FIG. 12 shows an exemplary embodiment of the ethnic class-dependent probabilistic graphical models.

FIG. 12 shows an exemplary embodiment of the ethnic class-dependent probabilistic graphical models. Having chosen the observation sequence for each ethnic class, a dedicated probabilistic graphical model is constructed utilizing the responses from ethnic class-dependent filter groups 534 as its observed quantities. In this exemplary embodiment, an HMM architecture is employed as a simple implementation of the probabilistic graphical model. The first row shows the ethnic class A probabilistic graphical model 923, the second row shows the ethnic class B probabilistic graphical model 924, and the third row shows the ethnic class C probabilistic graphical model 925.

Figure 13:
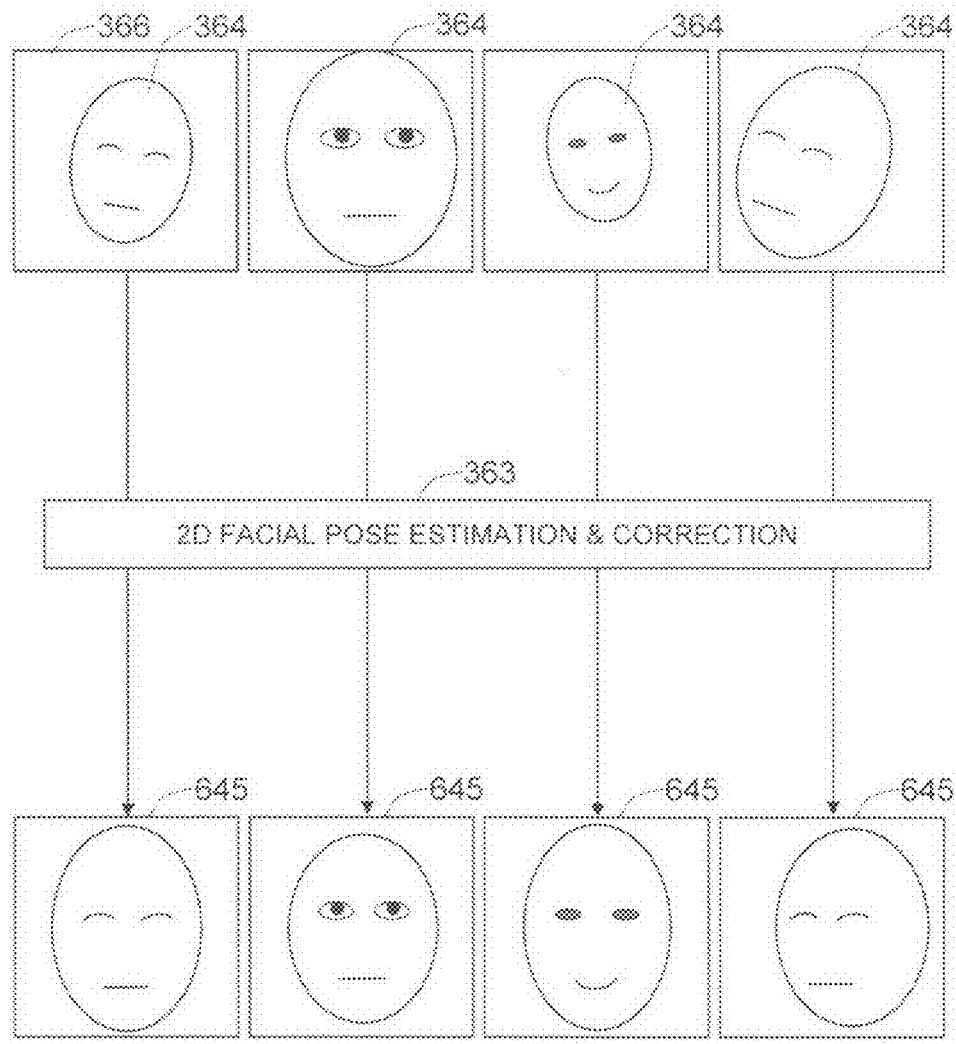
FIG. 13 shows the 2D facial pose estimation and correction step.

FIG. 13 shows the 2D facial pose estimation and correction 363 step. The tracked facial image should be normalized before it is fed to the ethnicity classification 802. In an exemplary embodiment, the facial images are aligned so that the respective facial features (eyes, mouths) match. First the 2D facial pose is estimated. A detected face 364 has varied position (X, Y) within the face window 366, and also has varied size S and orientation O. In an exemplary embodiment, the 2D pose (X, Y, S, O) is estimated using a learning machine regressor 832. Given the estimated (X, Y, S, O), the detected and tracked facial image is shifted, resized, and rotated so that the positions of the facial features match the standard positions. The 2D corrected facial image 645 is then fed to the ethnicity-sensitive image feature extraction 560 step.

Figure 14:
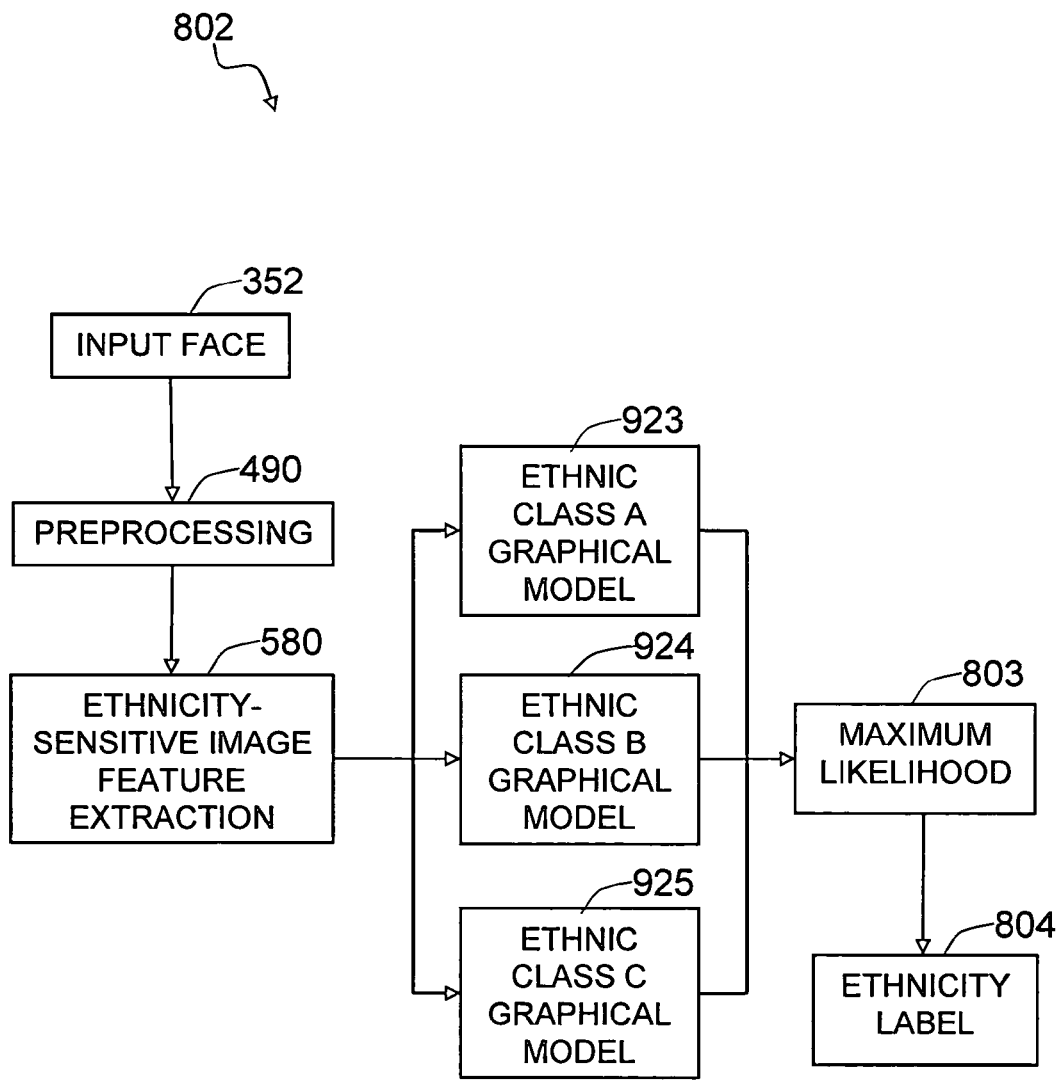
FIG. 14 shows an exemplary embodiment of the ethnic classification step.

FIG. 14 shows an exemplary embodiment of ethnicity classification 802 step. Once the input face 352 goes through the preprocessing 490 to normalize for facial pose and lighting, it is fed to the ethnicity-sensitive image feature extraction 580 step to compute the ethnicity-sensitive image features 550. The extracted image feature vector is then fed to each of the ethnic class-dependent probabilistic graphical models—ethnic class A probabilistic graphical model 923, ethnic class B probabilistic graphical model 924, and ethnic class C probabilistic graphical model 925—to compute the likelihood of the input face belonging to each ethnic class. Whichever class that produced the maximum likelihood 803 is chosen as the ethnicity label 804 of the input face 352.

Figure 15:
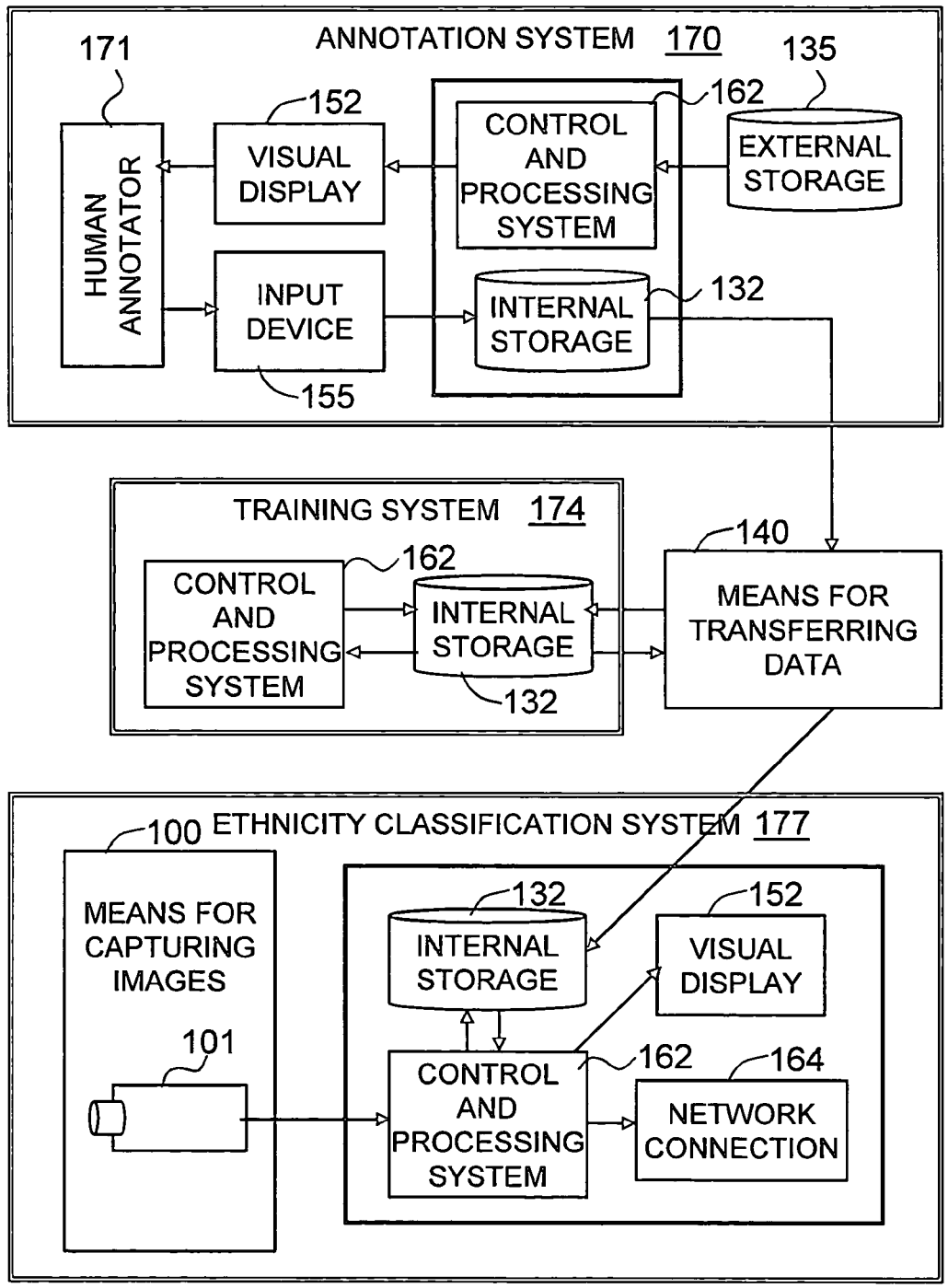
FIG. 15 shows exemplary hardware components in an exemplary embodiment of the present invention.

FIG. 15 shows exemplary hardware components in an exemplary embodiment of the present invention. The hardware components consist of three subsystems: the annotation system 170, the training system 174, and the ethnicity classification system 177.

In an exemplary embodiment of the present invention, the annotation system 170 comprises a human annotator 171, an external storage 135 with a facial image database, and a computer system that consists of a visual display 152, an input device 155, a control and processing system 162, and an internal storage 132. The external storage 135 can comprise a storage computer server or an external hard disk: The visual display 152 can comprise a CRT or an LCD monitor. The input device 155 can comprise a keyboard and a mouse. In an exemplary embodiment, a Pentium 4 2.8 GHz PC having 1 GB memory can serve as a control and processing system 162. A generic IDE hard disk drive can serve as the internal storage 132. The control and processing system 162 samples and fetches a facial image from the external storage 135, and displays it to the visual display 152. The human annotator 171 then annotates the facial image based on the displayed images, and records the annotated training data to the internal storage 132 using the input device 155.

In an exemplary embodiment of the present invention, the training system 174 comprises a generic personal computer having a control and processing system 162 and an internal storage 132. A Pentium 4 2.8 GHz PC having 1 GB memory can serve as a control and processing system 162. A generic IDE hard disk drive can serve as the internal storage 132. The annotated training data from the annotation system 170 can be transferred to the internal storage 132 of the training system 174 using the means for transferring data 140. The means for transferring data 140 can comprise a direct cable connection or a network connection. The control and processing system then applies the training algorithm to generate the trained probabilistic graphical models.

In an exemplary embodiment of the present invention, the ethnicity classification system 177 comprises the means for capturing images 100, a computer system having a control and processing system 162, and an internal storage 132. The trained probabilistic graphical models can be transferred to the internal storage 132 of the ethnicity classification system 177 using the means for transferring data 140. In the exemplary embodiment, a plurality of means for capturing images 100 is connected to the control and processing system 162. The control and processing system takes digitized video data from the means for capturing images 100. The control and processing system 162 then processes the digitized facial images using the trained probabilistic graphical models to determine the ethnic class of the facial image. The classified ethnicity label 804 can be stored in the internal storage 132, or can be displayed to the visual display 152, or can be transmitted remotely using the network connection 164.

The means for capturing images 100 can comprise an analog camera, USB camera, or Firewire camera. The means for video interface 105, which can comprise a video frame grabber, USB interface, or Firewire interface, is typically included in the same enclosure as the control and processing system 162. The control and processing system 162 can be a general-purpose personal computer, such as a Pentium 4 PC, or a dedicated hardware that can carry out the required computation.

In an exemplary embodiment, a general-purpose USB webcam can serve as the means for capturing images 100. A Pentium 4 2.8 GHz PC having 1 GB memory can serve as a control and processing system 162. A generic IDE hard disk drive can serve as the internal means for storing data 132.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for determining ethnicity of people based on their facial images captured by at least a means for capturing images for a target person, comprising the following steps of:
   a) forming image filter groups in a plurality of image filters,
   b) computing filter responses by applying the image filters to facial images from an ethnicity-annotated facial images database,
   c) computing joint histograms of the filter responses within each filter group,
   d) deriving ethnicity-sensitive image features from the image filter groups based on contributions of the groups to a task of recognizing a given ethnic class against other ethnic classes,
   e) constructing probabilistic graphical models for recognizing the ethnicity of people using the ethnicity-sensitive image features as observable quantities of the probabilistic graphical models,
   f) training the probabilistic graphical models using the ethnicity-annotated facial images so that each of the probabilistic graphical models is dedicated to represent one ethnic class,
   g) extracting the ethnicity-sensitive image features of an input face, and
   h) determining the ethnic class of the input face based on the outputs computed from the probabilistic graphical models using the ethnicity-sensitive image features,
   wherein the ethnicity-sensitive image features are extracted based on specific locations from the facial images, and
   wherein the contribution of the grouping is computed based on comparison between the first joint histograms of the image filter responses conditioned on the given ethnic class and the second joint histograms of the image filter responses conditioned on other ethnic classes.

2. The method according to claim 1, wherein the method further comprises a step of constructing filter groups by sampling pairs of filters from image filters matched to facial features so that the image filters from each pair represent different facial features,
   wherein each image filter responds to a specific color, size, and shape of one facial feature, and
   wherein a subset of the filter pairs is chosen to represent each ethnic class.

3. The method according to claim 1, wherein the method further comprises a step of training the probabilistic graphical models to produce high likelihood scores to facial images belonging to the given ethnic class, and to produce low likelihood scores to facial images belonging to other ethnic classes.

4. The method according to claim 1, wherein the method further comprises a step of using learning machines for estimating and correcting facial pose of the input face,
   wherein the corrected input face is fed to an ethnicity-sensitive image feature extraction step.

5. A system for determining ethnicity of people based on their facial images, comprising:
   a) an annotation system that comprises a human annotator, an external storage with a facial image database, and a computer system that consists of a visual display, an input device, a control and processing system, and an internal storage, b) a training system that comprises a computer system having a control and processing system and an internal storage, wherein the training system is programmed to perform the following steps of:

forming image filter groups in a plurality of image filters, computing filter responses by applying the image filters to facial images from an ethnicity-annotated facial images database, computing joint histograms of the filter responses within each filter group, deriving ethnicity-sensitive image features from the image filter groups based on contributions of the groups to a task of recognizing a given ethnic class against other ethnic classes, constructing probabilistic graphical models for recognizing the ethnicity of people using the ethnicity-sensitive image features as observable quantities of the probabilistic graphical models, and training the probabilistic graphical models using the ethnicity-annotated facial images so that each of the probabilistic graphical models is dedicated to represent one ethnic class, and c) an ethnicity classification system that comprises at least a means for capturing images, a computer system having a control and processing system and an internal storage, wherein the ethnicity classification system is programmed to perform the following steps of:

extracting the ethnicity-sensitive image features of an input face, and determining the ethnic class of the input face based on the outputs computed from the probabilistic graphical models using the ethnicity-sensitive image features, wherein the ethnicity-sensitive image features are extracted based on specific locations from the facial images, and wherein the contribution of the grouping is computed based on comparison between the first joint histograms of the image filter responses conditioned on the given ethnic class and the second joint histograms of the image filter responses conditioned on other ethnic classes.

6. The system according to claim 5, wherein the system further comprises a computer system for constructing filter groups by sampling pairs of filters from image filters matched to facial features so that the image filters from each pair represent different facial features, wherein each image filter responds to a specific color, size, and shape of one facial feature, and wherein a subset of the filter pairs is chosen to represent each ethnic class.

7. The system according to claim 5, wherein the system further comprises a computer system for training the probabilistic graphical models to produce high likelihood scores to facial images belonging to the given ethnic class, and to produce low likelihood scores to facial images belonging to other ethnic classes.

8. The system according to claim 5, wherein the system further comprises a computer system for using learning machines for estimating and correcting facial pose of the input face, wherein the corrected input face is fed to an ethnicity-sensitive image feature extraction step.

* * * * *